(No Model.)

B. F. RIX.
ROAD CART.

No. 391,863. Patented Oct. 30, 1888.

Witnesses.

Inventor:
Benjamin F. Rix
By J. W. Robertson
Atty.

UNITED STATES PATENT OFFICE.

BENJAMIN F. RIX, OF KALAMAZOO, MICHIGAN.

ROAD-CART.

SPECIFICATION forming part of Letters Patent No. 391,863, dated October 30, 1888.

Application filed June 3, 1887. Serial No. 240,182. (No model.)

*To all whom it may concern:*

Be it known that I, BENJAMIN F. RIX, of Kalamazoo, in the county of Kalamazoo and State of Michigan, have invented new and useful Improvements in Road Carts; and I do hereby declare that the following is a full, clear, and exact description thereof, reference being had to the accompanying drawings, which form a part of this specification.

This invention relates to certain new and useful improvements in road-carts; and the invention consists in the peculiar construction and arrangement of parts constituting the seat-support and in the general combination of parts, all as more fully hereinafter set forth.

Figure 1:
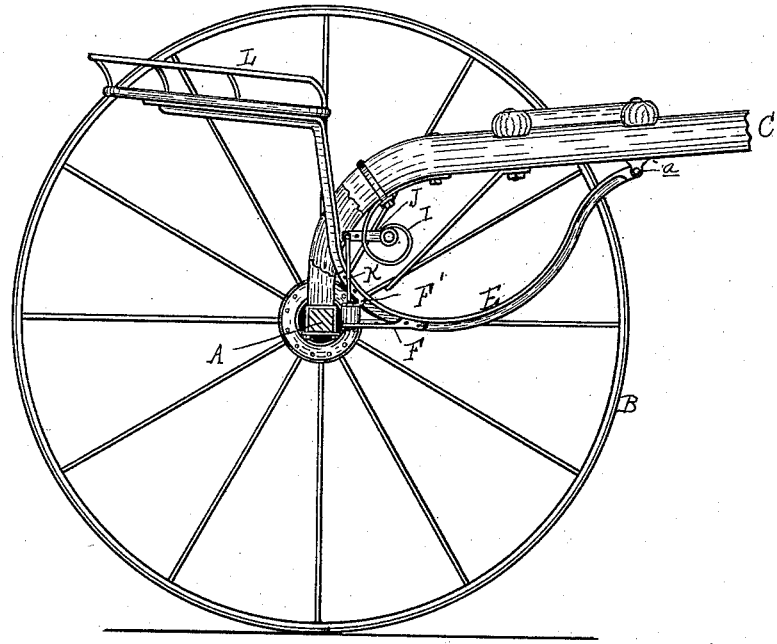
Figure 2:
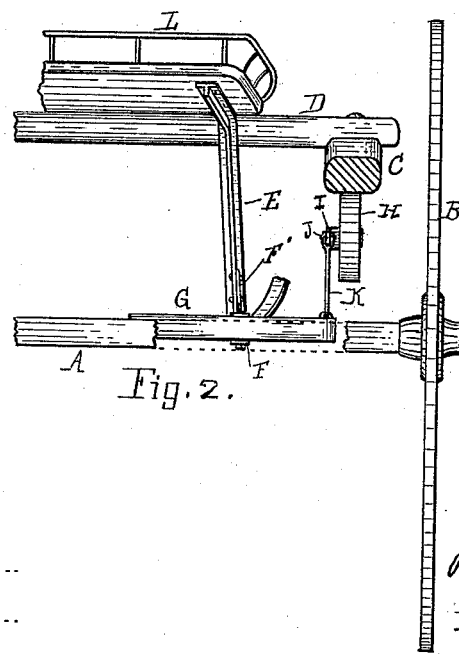

Figure 1 is a side elevation of my improved cart with one of the wheels removed. Fig. 2 is a sectional rear view with parts broken away to show the arrangement of the seat-support.

In the accompanying drawings, which form a part of this specification, A represents the axle, B the wheels, C the thills or shafts, and D the cross-bar, of a road-cart, all of the ordinary construction and arrangement now in general use, and which in themselves form no part of my present invention.

E represents angle-iron seat-supports, which are bent in substantially the form shown, their forward ends being pivotally secured to the under side of the shafts C, as at *a*, while their rear ends are bent nearly horizontally to the rear and have secured to them the seat.

The seat-supporting irons E are provided with suitable bracket-irons, F, which are rigidly secured to the spring-bar G; and F' are other irons, which connect the top of the spring-bar with the irons E, the two holding the said spring-bar in its proper relative position and prevent it from tipping, and thus bring a torsional strain upon the securing-bolts.

H are helical springs, one being rigidly secured to each shaft, as shown. To the inner coil of these springs is rigidly secured a laterally-projecting arm, I. To the inner ends of these arms are likewise rigidly secured the rearwardly-projecting lever-arms J, the free ends of which are connected by means of the irons K to or near the outer ends of the spring-bar G.

It will readily be seen that in this construction and arrangement of parts the weight of the driver seated upon the seat is supported by the spring-bar and its connections with the shafts directly in front of the axle, and that the seat is free to move in a vertical play independent from the motion of the shafts caused by the movement of the animal when in motion; that the parts are not in the way in mounting or dismounting, and that the vehicle is devoid of the so-called "horse motion."

What I claim as my invention is—

1. In a two-wheeled vehicle, the combination, with the shafts and the spring-bar G, of the seat-supports E, pivotally connected at one end to said shafts and between their ends to the spring-bar, the helical springs H, secured to the shafts, the lever-arms I, and irons K, connecting said helical springs with the outer ends of said spring-bar, substantially as described.

2. In a two-wheeled vehicle, the combination of the shafts C, seat-supports E, irons F F', spring-bar G, helical springs H, and connections I, J, and K between said springs H and the spring-bar G, the parts being constructed, arranged, and operating substantially in the manner and for the purposes specified.

B. F. RIX.

Witnesses:
   H. S. SPRAGUE,
   A. BARTHEL.